United States Patent
Fujita

(10) Patent No.: US 7,926,264 B2
(45) Date of Patent: Apr. 19, 2011

(54) VEHICLE EXHAUST SYSTEM

(75) Inventor: Akihiro Fujita, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 623 days.

(21) Appl. No.: 12/099,689

(22) Filed: Apr. 8, 2008

(65) Prior Publication Data
US 2009/0019841 A1    Jan. 22, 2009

(30) Foreign Application Priority Data
Apr. 9, 2007   (JP) ................... 2007-101576

(51) Int. Cl.
*F01N 3/10* (2006.01)
*B60K 13/04* (2006.01)

(52) U.S. Cl. ............... 60/299; 60/282; 60/301; 60/302

(58) Field of Classification Search ............ 60/302, 60/312, 313, 299, 323
See application file for complete search history.

(56) References Cited

U.S. PATENT DOCUMENTS

| | | | | |
|---|---|---|---|---|
| 3,653,212 A | * | 4/1972 | Gast et al. | 60/293 |
| 3,984,975 A | * | 10/1976 | Price | 60/274 |
| 5,239,826 A | * | 8/1993 | Hirota et al. | 60/302 |
| 5,445,241 A | * | 8/1995 | Nakamura et al. | 180/296 |

FOREIGN PATENT DOCUMENTS

| | | | |
|---|---|---|---|
| JP | 06-159045 A | | 6/1994 |
| JP | 06159045 A | * | 6/1994 |
| JP | 2005-009340 A | | 1/2005 |
| JP | 2005009340 A | * | 1/2005 |

* cited by examiner

*Primary Examiner* — Thomas E Denion
*Assistant Examiner* — Patrick Maines
(74) *Attorney, Agent, or Firm* — Lesley S. Craig

(57) ABSTRACT

An exhaust system for a V-engine vehicle with enhanced exhaust gas purifying capacity and output performance is provided. In the exhaust system, a second bank offset from a first bank backward in the longitudinal direction of the vehicle is mounted in an engine compartment (6) in front of a dash panel (5), and a first catalytic converter (28) is connected to a rear end portion of a first exhaust manifold (27) of the first bank; a second catalytic converter (30) is connected to a rear end portion of a second exhaust manifold (29) of the second bank. Furthermore, an inlet port (28*a*) of the first catalytic converter (28) is positioned at a frontward portion of the vehicle (1) with respect to an inlet port (30*a*) of the second catalytic converter (30) and the frontward angle of inclination of the center line of the first catalytic converter (28) is greater than that of the second catalytic converter (30).

3 Claims, 5 Drawing Sheets

VEHICLE EXHAUST SYSTEM

FIELD OF THE INVENTION

The present invention relates to an exhaust system for vehicles, and more specifically to an exhaust system for a vehicle in which the layout of an exhaust system for a V-engine is improved for enhancing engine output performance.

BACKGROUND OF THE INVENTION

A vehicle includes an engine or a transmission arranged next to each other either in the longitudinal direction or the lateral direction of the vehicle, such engines including common engines in which the cylinders are in line or in a V-engine arrangement.

Prior art for the present invention is formed by the contents of Japanese Laid-Open Patent Publication No. HEI 6-159045 and Japanese Laid-Open Patent Publication No 2005-9340.

PROBLEMS TO BE SOLVED BY THE INVENTION

Vehicles having a V-engine are well known. Such engines have a structure in which the V-engine is provided in an engine compartment arranged in a frontward portion of the vehicle with the output shaft oriented in the longitudinal direction of the vehicle, and first and second catalytic converters are mounted via first and second exhaust manifolds respectively to first and second banks of the V-engine.

In such a structure, the first and second catalytic converters are often provided along the longitudinal direction of the vehicle in a space between an engine mount and a dash panel at horizontally symmetrical positions with horizontally symmetrical inclinations.

On the other hand, in the V-engine described here above, the second bank is offset with respect to the first bank backward in the longitudinal direction of the vehicle, and because of the configuration, the distance of one bank from an exhaust port thereof via an exhaust manifold up to an inlet portion of each catalytic converter are different from that of the other bank, and because of this difference, the temperature rise characteristics of the first catalytic converter is different from that of the second catalytic converter, which disadvantageously lowers exhaust gas purifying performance.

Furthermore, first and second exhaust pipes connected to outlet ports of the first and second catalytic converters respectively converge in most cases into each other and the converged pipe extends to a rear portion of the vehicle, but when the convergence section is positioned at the bank offset towards the rear of the vehicle, the lengths of the first and second catalytic converters from the output ports to the convergence section are not equal, thereby disadvantageously lowering the output performance of the engine.

SUMMARY OF THE INVENTION

An object of the present invention is to provide an exhaust system, for a vehicle with a V-engine mounted thereon, capable of improving exhaust gas purifying performance and enhancing output performance of the engine.

To overcome the problems described above, the present invention provides an exhaust system for a vehicle in which a V-engine with a second bank offset with respect to a first bank to a rear portion of the vehicle is mounted in an engine compartment in front of a dash panel, a first catalytic converter with the center line thereof extending to a lower portion of the vehicle is connected to a rear portion of a first exhaust manifold connected to the first bank, a second catalytic converter is connected to a rear portion of a second exhaust manifold connected to the second bank so that the center line thereof extends to a lower portion of the vehicle, and a convergence section, in which a first exhaust pipe connected to an outlet port of the first catalytic converter and a second exhaust pipe connected to an outlet port of the second catalytic converter are converged into each other, is provided under a floor at the back of the dash panel and at a side closer to the second bank in the lateral direction of the vehicle, and the exhaust system is characterized in that an inlet port of the first catalytic converter is provided in a frontward position in the vehicle with respect to an inlet port of the second catalytic converter, and also in that an angle of inclination of the center line of the first catalytic converter toward a frontward portion of the vehicle is greater than that of the second catalytic converter.

EFFECT OF THE INVENTION

As described in detail above, the present invention provides an exhaust system for a vehicle in which a V-engine with a second bank offset with respect to a first bank to a rear portion of the vehicle is mounted in an engine compartment in front of a dash panel, a first catalytic converter with the center line thereof extending to a lower portion of the vehicle is connected to a rear portion of the first exhaust manifold connected to the first bank, a second catalytic converter is connected to a rear portion of a second exhaust manifold connected to the second bank so that the center line thereof extends to a lower portion of the vehicle, and a convergence section, in which a first exhaust pipe connected to an outlet port of the first catalytic converter and a second exhaust pipe connected to an outlet port of the second catalytic converter are converged into each other, is provided under a floor at the back of the dash panel and at a side closer to the second bank in the lateral direction of the vehicle, and the exhaust system is characterized in that an inlet port of the first catalytic converter is provided in a frontward position in the vehicle with respect to an inlet port of the second catalytic converter, and also in that an angle of inclination of the center line of the first catalytic converter toward a frontward portion of the vehicle is greater than that of the second catalytic converter.

Further, this exhaust system may comprise a first path extending in the longitudinal direction of the vehicle and a second path converged into this first path diagonally from the outward and frontward side are provided in the convergence section; the first exhaust pipe is converged into the first path; and the second exhaust pipe bends and protrudes outward in the lateral direction of the vehicle and is converged into the second path.

Furthermore, in this exhaust system, the V-engine is supported via a sub-frame by and between a pair of frame members; a frame mounting section fixed to the frame protrudes from a rear portion of the sub-frame outward in the lateral direction of the vehicle when viewed from the top of the vehicle; and the second exhaust pipe bends along a rear edge portion of the frame mounting section outward in the lateral direction of the vehicle.

Because the inlet port of the first catalytic converter is provided at a frontward position of a vehicle from the inlet portion of the second catalytic converter, the first catalytic converter can be provided at a position closer to the first exhaust manifold as compared to the case in which the first catalytic converter and the second catalytic converter are provided at horizontally symmetrical positions, and due to this feature, exhaust gas decomposition performance can be enhanced through a reduction in the time required for the first catalytic converter to heat up to the required temperature.

Furthermore, because an angle of inclination of a center line of the first catalytic converter toward a frontward portion of the vehicle is greater than that of the second catalytic converter, a pipe length from the first exhaust manifold to the convergence section can be made shorter as compared to a configuration in which the angle of inclination of a center line of the first catalytic converter toward a frontward portion of the vehicle is identical to that of the second catalytic converter, so that the output performance of the engine can be enhanced by reducing a difference between the pipe length from the first exhaust manifold to the convergence section and the pipe length from the second exhaust manifold to the convergence section.

An embodiment of the present invention is described in detail below with reference to the drawings.

BEST MODE FOR CARRYING OUT THE INVENTION

Figure 1:
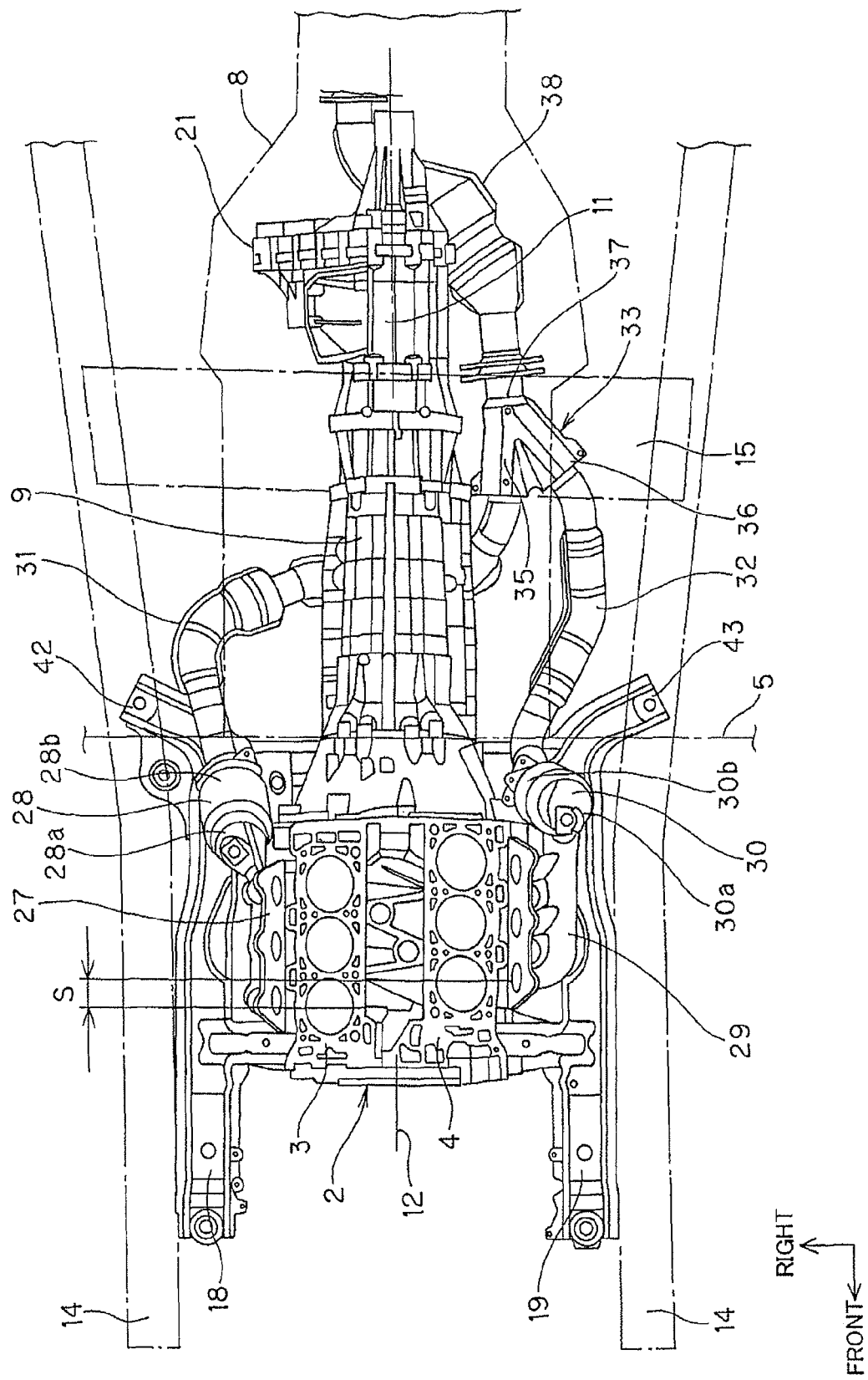
FIG. 1 is an enlarged general plan view of an exhaust system for a vehicle according to an embodiment of the present invention.
Figure 2:
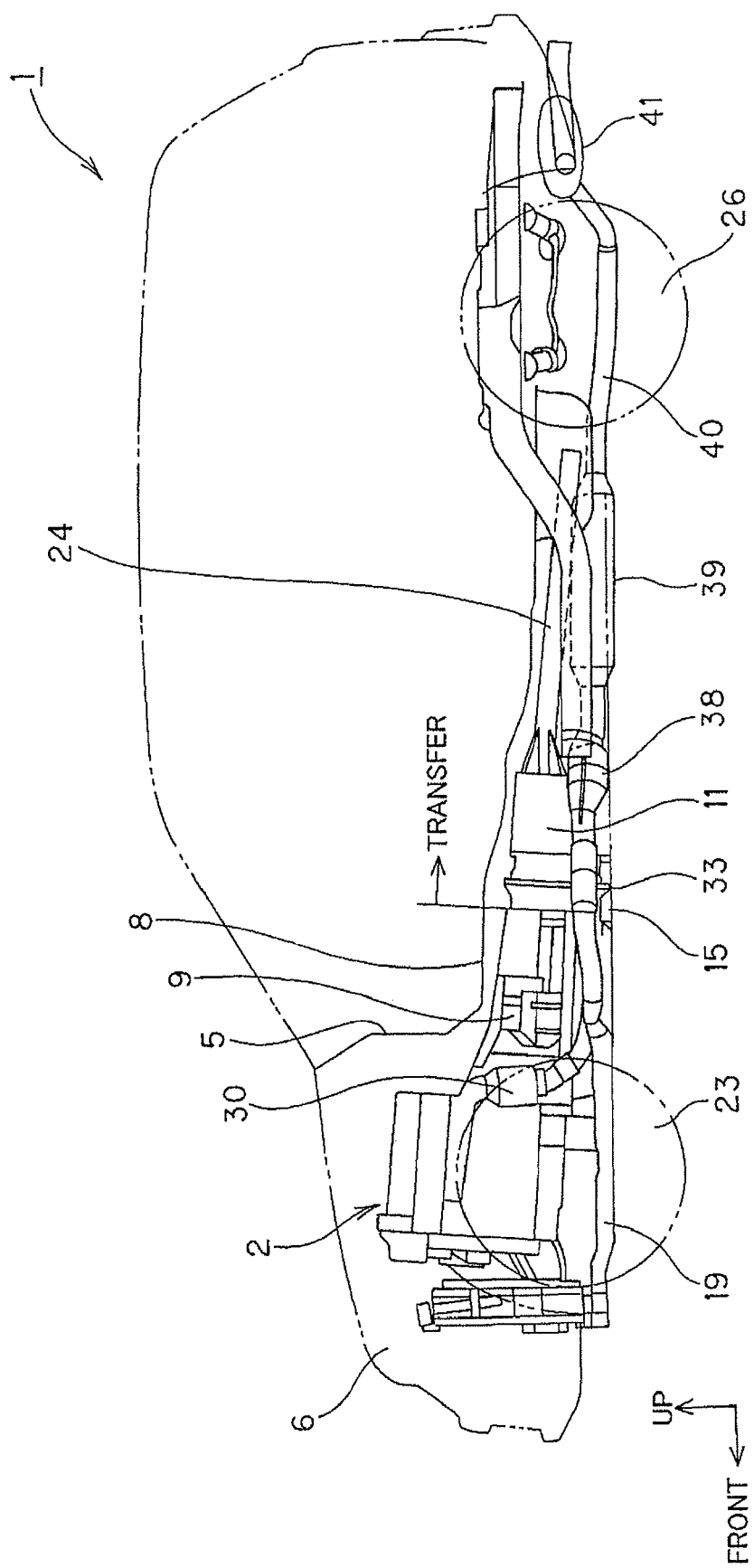
FIG. 2 is a left side view of the exhaust system 25 for a vehicle.
Figure 3:
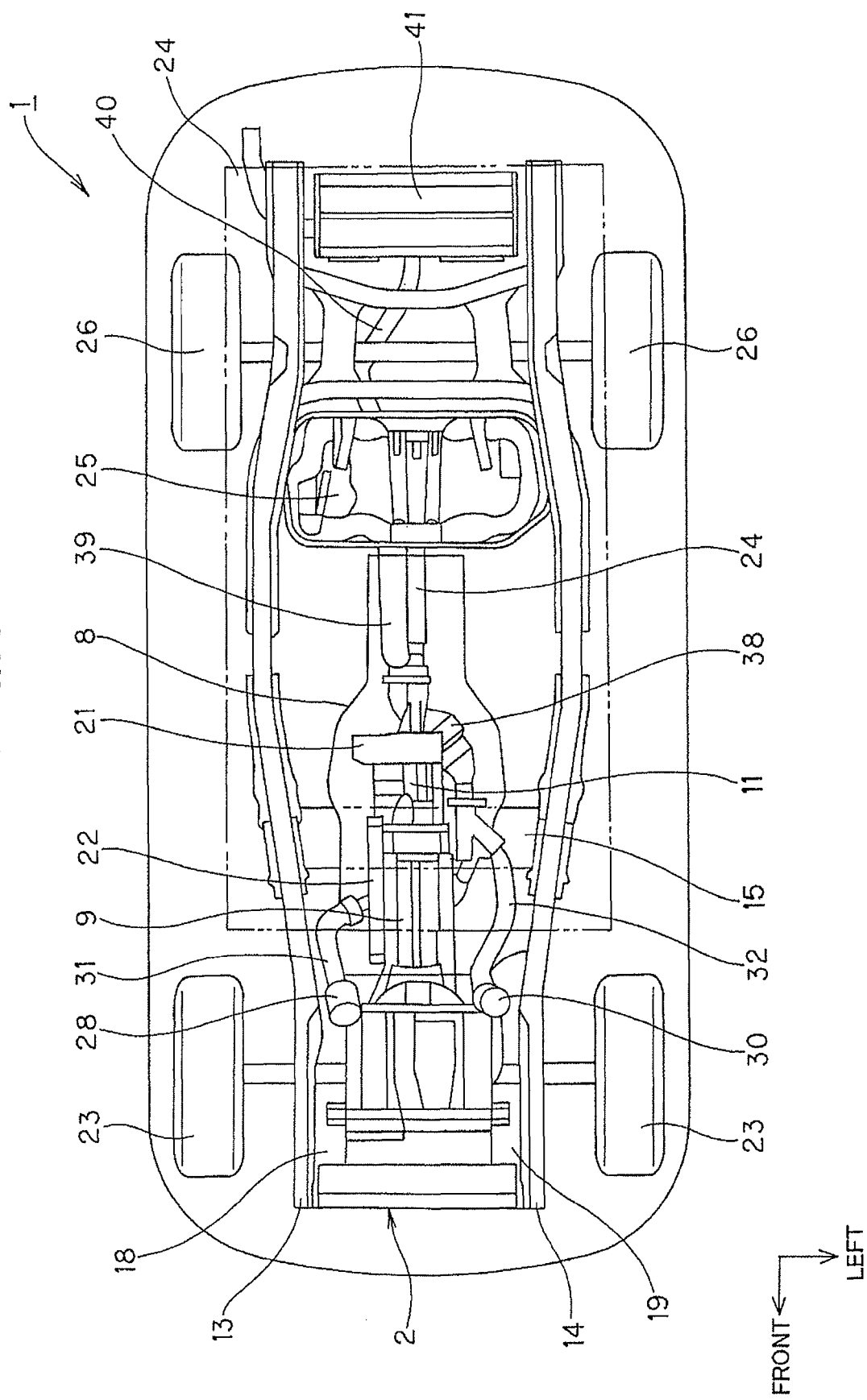
FIG. 3 is a bottom view of the exhaust system for a vehicle.

In FIG. 2 and FIG. 3, reference numeral 1 denotes a vehicle and 2 denotes a V-engine mounted on the vehicle 1. In the V-engine 2, a second bank 4 at a left side in the lateral direction of the vehicle is offset by a distance S toward a backward portion of the vehicle from a first bank 3 at a right side of the vehicle in the lateral direction as shown in FIG. 1.

Figure 4:
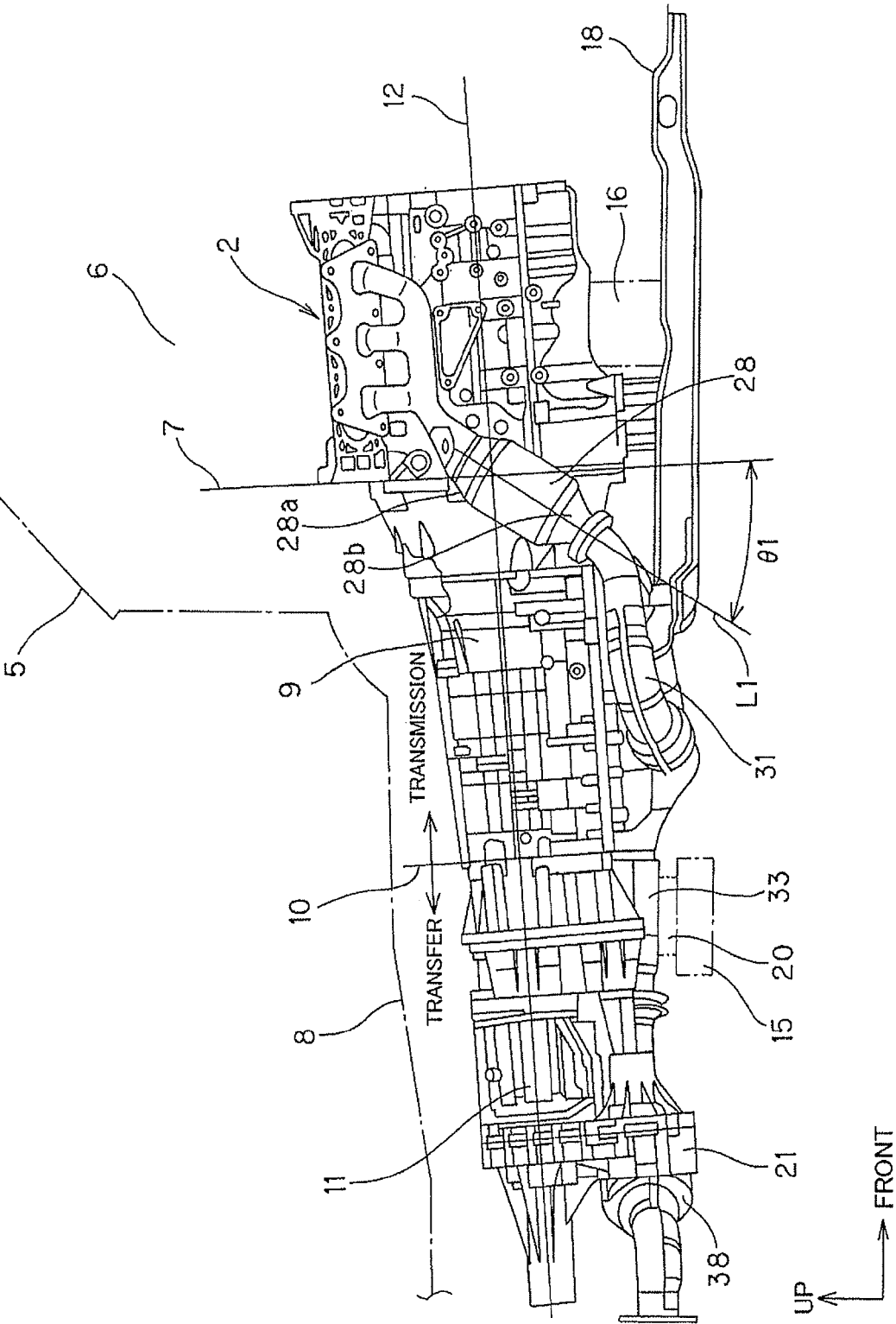
FIG. 4 is a simplified right side view of the exhaust system mounted on a vehicle.
Figure 5:
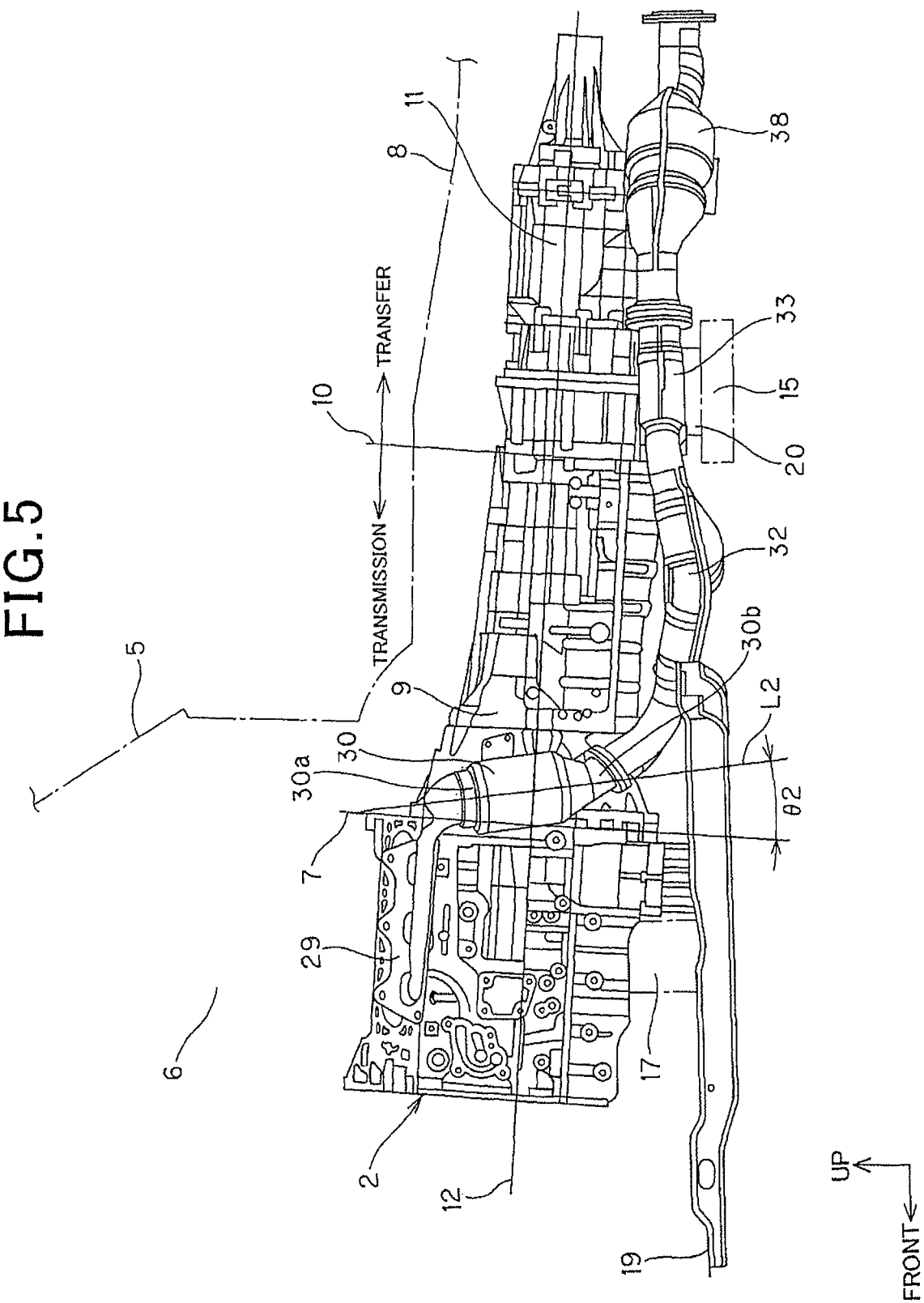
FIG. 5 is a simplified left side view of the exhaust system mounted on a vehicle.

The V-engine 2 is mounted inside an engine compartment 6 provided frontward from a dash panel 6 as shown in FIG. 2, FIG. 4, and FIG. 5.

A transmission 9 is connected to a transmission mounting surface 7 at the rear of the V-engine 2 in the longitudinal direction of the vehicle via a tunnel 8 formed on a floor 34 described below and provided at the back of the dash panel 5, and a transfer 11 is connected to a transfer mounting surface 10 at the back of the V-engine 2 in the longitudinal direction of the vehicle to adapt an output shaft 12 extending from the V-engine 2 via the transmission 9 up to the transfer 11 along a straight line.

Because of the configuration described above, when the V-engine 2, the transmission 9, and the transfer 11 are to be mounted on the vehicle 1, it is possible to mount the V-engine 2, the transmission 9, and the transfer 11 each having considerable weight along a straight line extending in the longitudinal direction and at a central portion in the lateral sense of the vehicle, which insures stable weight balance in the vehicle.

The vehicle 1 has first and second frame members 13 and 14 extending at right and left sides of the vehicle along the longitudinal direction of the vehicle and a plurality of cross members attached to the first and second frame members 13, 14 and extending in the lateral direction of the vehicle as shown in FIG. 1 and FIG. 3.

Through this configuration, rigidity of the vehicle 1 can be enhanced by the first and second frame members 13, 14 extending in the longitudinal direction and the plurality of cross members 15 extending in the lateral direction of the vehicle.

As shown in FIG. 1, FIG. 4, and FIG. 5, the V-engine 2 is supported between the first and second frame members 13, 14 via first and second mounts 16, 17 and first and second sub-frames 18, 19 provided at right and left sides of the vehicle 1 respectively.

Thanks to this configuration, the V-engine 2 can be tightly held between the first and second frame members 13, 14 via the first and second sub-frames 18, 19, and also vibrations delivered from the V-engine 2 to the vehicle body by the first and second mounts 16, 17 can effectively be interrupted.

Furthermore, the transfer 11 is supported on the 10 cross member 15 via a rear mount 20 as shown in FIG. 4 and FIG. 5. This configuration ensures the transfer 11 is supported tightly by cross member 15, and communication by rear mount 20 of vibrations from the V-engine 2 via the transfer 11 to the vehicle body can effectively be interrupted.

As shown in FIG. 1 and FIG. 3, the front wheel output section 21 is provided at the back of the transfer 11 at a right side of the vehicle body, and a driving force is delivered via a front propeller shaft 22 connected to the front wheel output section 21 to front wheels 23.

Furthermore, as shown in FIG. 3, the driving force is delivered to a rear wheel 26 positioned at the back of a fuel tank 25 via a rear propeller shaft 24 connected to the transfer 11.

Because of this configuration, the driving force is delivered to the front and rear wheels 23, 26 respectively by the transfer 11 and the front wheel output section 21, and therefore it is possible to improve vehicle stability and operability while driving with the four wheels, As shown in FIG. 4, a first catalytic converter 28 is connected to a rear portion of a first exhaust manifold 27 connected to the first bank 3 so that the center line L1 extends to a lower portion of the vehicle.

In this configuration, exhaust gas discharged from the first bank 3 via the first exhaust manifold 27 can be purified by the first catalytic converter 28, and also a space for arrangement of the first catalytic converter 28 can be shortened in the longitudinal direction of the vehicle.

On the other hand, as shown in FIG. 5, a second catalytic converter 30 is connected to a rear portion of the second exhaust manifold 29 connected to the second bank 4 so that the center line L2 extends to a lower portion of the vehicle.

Additionally, exhaust gas discharged from second bank 4 via the second exhaust manifold 29 can be purified by the second catalytic converter 30, and also a space for arrangement of the second catalytic converter 30 can be shortened in the longitudinal direction of the vehicle.

As shown in FIG. 1, FIG. 4, and FIG. 5, a convergence section 33, in which a first exhaust pipe 31 connected to an outlet portion 28b of the first catalytic converter 28 and a second exhaust pipe 34 connected to an outlet portion 30b of the second catalytic converter 30 are converged into each other, is provided under a floor 34 at the back of the dash panel 5 and at the side of the second bank 4 in the lateral direction of the vehicle.

Because of the configuration described above, the convergence section 33 is not placed above or under the transmission 9 or the transfer 11, and therefore dimensions of the vehicle in the vertical direction can be reduced.

In this configuration, the convergence section 33 is provided on an upper surface of the cross member 15 as shown in FIG. 1, FIG. 4, and FIG. 5.

Thanks to this configuration, the convergence section 33 can effectively be prevented from being damaged by a stone flying up from the road or by contact with any obstacle.

Furthermore, the inlet port 28a of the first catalytic converter 28 is provided at a frontward position from the inlet port 30a of the second catalytic converter 30 in the longitudinal direction of the vehicle, and an angle of inclination 01 of the center line L1 of the first catalytic converter 28 to a frontward portion of the vehicle is greater than an angle of inclination 02 of the center line L2 of the second catalytic converter 30 to a rear portion of the vehicle.

More specifically, the first catalytic converter 28 is provided at the back of the V-engine 2 and at the right side of the vehicle as shown in FIG. 1 and FIG. 4, and the inlet port 28a of the first catalytic converter 28 is positioned at an upper edge of the first catalytic converter 28.

Furthermore, as shown in FIG. 1 and FIG. 5, the second catalytic converter 30 is provided at the back of the V-engine 2 and also at the left side of the vehicle, and the inlet port 30a of the second catalytic converter 30 is positioned at an upper edge of the second catalytic converter 30.

In this configuration, as shown in FIG. 1, the inlet port 28a of the first catalytic converter 28 is positioned in the vehicle frontward from the inlet port 30a of the second catalytic converter 30.

Because the inlet port 28a of the first catalytic converter 28 is positioned frontward in the vehicle from the inlet port 30a of the second catalytic converter 30, the first catalytic converter 28 can be provided at a position closer to the first exhaust manifold 27 as compared to the case where the first catalytic converter 28 and the second catalytic converter 30 are symmetrically positioned in the lateral direction of the vehicle, and the exhaust gas purifying performance can be improved by reducing the time required for the first catalytic converter 28 to heat up.

Furthermore, as shown in FIG. 4, the angle of inclination 01 of the center line L1 of the first catalytic converter 28 to a frontward portion of the vehicle is an angle between the transmission mounting surface 7 at the back of the V-engine 2 in the longitudinal direction of the vehicle and the center line L1 of the first catalytic converter 28, and the angle of inclination 02 of the center line L2 of the second catalytic converter 30 to a front portion of the vehicle is an angle between the transmission mounting surface 7 at the back of the V-engine 2 in the longitudinal direction of the vehicle and the center line L2 of the second catalytic converter 30.

In this configuration, as shown in FIG. 4 and FIG. 5, the angle of inclination 01 of the center line L1 of the first catalytic converter 28 is greater than the angle of inclination 02 of the center line L2 of the second catalytic converter 30. Namely the first catalytic converter 28 is inclined more as compared to the second catalytic converter 30.

Because the angle of inclination 01 of the center line L1 of the first catalytic converter 28 to a frontward portion of the vehicle is greater than the angle of inclination 02 of the center line L2 of the second catalytic converter 30 to a front portion of the vehicle as described above, the pipe length from the first exhaust manifold 27 to the convergence section 33 can be shortened as compared to the case in which the angle of inclination of the center line L1 of the first catalytic converter 28 is identical to that of the center line L2 of the second catalytic converter 30, so that the output performance of the engine can be enhanced by reducing a difference between the pipe length from the first exhaust manifold 27 to the convergence section 33 and the pipe length from the second exhaust manifold 29 to the convergence section 33.

As shown in FIG. 1, a first path 35 extending in the longitudinal direction of the vehicle and a second path 36 converging from a diagonally front side to the first path 35 are formed in the convergence section 33, and the first exhaust path 31 is converged to the first path 35, while the second exhaust path 32 is bent outward in the lateral direction of the vehicle and converged into the second path 36.

Because of the configuration, it is possible to enhance the output performance of the engine by prolonging the second exhaust pipe 32 to further reduce a difference between the pipe length from the second exhaust manifold 29 to the convergence section 33 and the pipe length from the first exhaust manifold 27 to the convergence section 33.

As shown in FIG. 1 and FIG. 3 to FIG. 5, a third catalytic converter 38 positioned under the front wheel output section 21 of the transfer 11 is connected to a converging point 37 at a downstream end point of the convergence section 33.

Because of the configuration, the exhaust gas after the two exhaust pipes are converged to each other in the convergence section 33 can be purified by the third catalytic converter 38, and the exhaust gas can be purified twice, namely before and after convergence of the exhaust pipes, so that harmful components of the exhaust gas can effectively be removed.

As shown in FIG. 3, an upstream end portion of a sub-muffler 39 positioned under the rear propeller shaft 24 is connected to the downstream end portion of the third catalytic converter 38, and a third exhaust pipe 40 is connected to a downstream side end portion of the sub-muffler 39, and also the third exhaust pipe 40 passes under the fuel tank 25 and the rear propeller shaft 24, and the downstream side end portion of the third exhaust pipe 40 is connected to a main muffler 41 provided at a rear end portion of the vehicle.

Because of the configuration described above, when the sub-muffler 39 or the third exhaust pipe 40 is provided in the vehicle 1, it is possible to provide the sub-muffler 39 or the third exhaust pipe 40 to run straight in the longitudinal direction and under the rear propeller shaft 25 provided at a central portion in the lateral direction of the vehicle, which insures stable weight balance of the vehicle.

Furthermore, the V-engine 2 is supported between the first and second frame members 13 and 14 via the first and second sub-frames 18, 19.

When the vehicle is viewed from the top, as shown in FIG. 1 and FIG. 3, first and second frame mounting sections 42, 43 fixed to the first and second frame members 13, 14 respectively protrude from the rear portions of the first and second sub-frames outward in the lateral direction of the vehicle, and the second exhaust pipe 32 is bent outward in the lateral direction of the vehicle along a rear edge portion of the second frame mounting section 43.

When the second exhaust pipe 32 bends and protrudes outward in the lateral direction at the lowermost portion of the vehicle 1, the second exhaust pipe 32 could come into contact with any obstacle on the ground while the vehicle is running. In the embodiment of the present invention described above, the second exhaust pipe 32 is protected by the second frame mounting section 43, so that the second exhaust pipe 32 can still be arranged to substantially protrude outward in the lateral direction of the vehicle.

Because of this configuration, a difference between the length of the second exhaust pipe 32 and the length of the first exhaust pipe 31 can be reduced to enhance the output performance of the engine.

EXPLANATION OF REFERENCE NUMERALS

1: Vehicle
2: V-engine

3: First bank at a right side in the lateral direction of the vehicle
4: Second bank at a left side in the lateral direction of the vehicle
5: Dash panel
6: Engine compartment
7: Transmission mounting surface
8: Tunnel
9: Transmission
10: Transfer mounting surface
11: Transfer
12: Output shaft
13: First frame
14: Second frame
15: Cross member
18: First sub-frame
19: Second sub-frame
21: Front wheel output section
22: Front propeller shaft
24: Rear propeller shaft
27: First exhaust manifold (27)
28: First catalytic converter (28)
28*a*: Inlet port
28*b*: Outlet port
29: Second exhaust manifold (29)
30: Second catalytic converter
30*a*: Inlet port
30*b*: Outlet port
31: First exhaust pipe
32: Second exhaust pipe
33: Convergence section
34: Floor
35: First path
36: Second path
37: Converging point

What is claimed is:

1. An exhaust system for a vehicle having a structure in which a V-engine with a second bank offset backward with respect to a first bank in a longitudinal direction of the vehicle is mounted in an engine compartment provided in front of a dash panel; a first catalytic converter is connected to a rear portion of a first exhaust manifold connected to the first bank so that a center line thereof extends to a lower portion of the vehicle; a second catalytic converter connected to a rear portion of a second exhaust manifold connected to the second bank so that a center line thereof extends to a lower portion of the vehicle; and a convergence section, in which a first exhaust pipe connected to an exit portion of the first catalytic converter and a second exhaust pipe connected to an exit portion of the second catalytic converter are converged therein, is provided under a floor at the back of the dash panel and also at a side closer to the second bank in a lateral direction of the vehicle, wherein an entrance portion of the first catalytic converter is positioned in front of an entrance portion of the second catalytic converter in the longitudinal direction of the vehicle; and an angle of inclination of the center line of the first catalytic converter to a front side of the vehicle is greater than that of a center line of the second catalytic converter to a front side of the vehicle.

2. The exhaust system for a vehicle according to claim 1, wherein a first path extending in the longitudinal direction of the vehicle and a second path converged into said first path diagonally from an outward and frontward side are provided in the convergence section; the first exhaust pipe is converged into the first path; and the second exhaust pipe bends and protrudes outward in the lateral direction of the vehicle and is converged into the second path.

3. The exhaust system for a vehicle according to claim 1, wherein the V-engine is supported via a sub-frame by and between a pair of frame members; a frame mounting section fixed to the frame protrudes from a rear portion of the sub-frame outward in the lateral direction of the vehicle when viewed from a top of the vehicle; and the second exhaust pipe bends along a rear edge portion of the frame mounting section outward in the lateral direction of the vehicle.

* * * * *